US010043532B2

(12) United States Patent
Tsujikawa et al.

(10) Patent No.: US 10,043,532 B2
(45) Date of Patent: Aug. 7, 2018

(54) SIGNAL PROCESSING APPARATUS, SIGNAL PROCESSING METHOD, AND SIGNAL PROCESSING PROGRAM

(71) Applicant: NEC CORPORATION, Tokyo (JP)

(72) Inventors: Masanori Tsujikawa, Tokyo (JP); Ryosuke Isotani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/126,135

(22) PCT Filed: Dec. 26, 2014

(86) PCT No.: PCT/JP2014/084617
§ 371 (c)(1),
(2) Date: Sep. 14, 2016

(87) PCT Pub. No.: WO2015/141103
PCT Pub. Date: Sep. 24, 2015

(65) Prior Publication Data

US 2017/0084290 A1 Mar. 23, 2017

(30) Foreign Application Priority Data

Mar. 17, 2014 (JP) ................................. 2014-054239

(51) Int. Cl.
*G10L 21/02* (2013.01)
*G10L 19/012* (2013.01)
(Continued)

(52) U.S. Cl.
CPC ...... *G10L 21/0264* (2013.01); *G10L 21/0208* (2013.01); *G10L 21/0272* (2013.01); *H04R 3/00* (2013.01); *G10L 2021/02166* (2013.01)

(58) Field of Classification Search
CPC ....... G10L 21/02; G10L 19/012; G10L 15/21; H04B 15/10
(Continued)

(56) References Cited

U.S. PATENT DOCUMENTS 5,400,409 A * 3/1995 Linhard .............. G10L 21/0208 381/92
2004/0049383 A1* 3/2004 Kato .................. G10L 21/0208 704/226
(Continued)

FOREIGN PATENT DOCUMENTS

JP 2002-204175 7/2002
JP 2005-049364 2/2005
(Continued)

OTHER PUBLICATIONS

International Search Report, PCT/JP2014/084617, dated Apr. 7, 2015.
(Continued)

*Primary Examiner* — Seong Ah A Shin
(74) *Attorney, Agent, or Firm* — Young & Thompson

(57) ABSTRACT

To remove only noise components without removing desired signal components, a signal processing apparatus includes a noise decorrelator that removes noise signals having correlation between at least two input signals, in each of which a desired signal and a noise signal coexist, by receiving the at least two input signals from at least two channels, and a residual noise remover that removes residual noise included in an output signal of the noise decorrelator based on a phase difference between the output signal of the noise decorrelator and at least one input signal included in the at least two input signals.

8 Claims, 12 Drawing Sheets

(51) Int. Cl.

| | |
|---|---|
| ***G10L 21/0264*** | (2013.01) |
| ***H04R 3/00*** | (2006.01) |
| ***G10L 21/0208*** | (2013.01) |
| ***G10L 21/0272*** | (2013.01) |
| *G10L 21/0216* | (2013.01) |

(58) Field of Classification Search
USPC .......................... 704/226, 228, 233; 381/94.1
See application file for complete search history.

(56) References Cited

U.S. PATENT DOCUMENTS

| | | | | |
|---|---|---|---|---|
| 2005/0159945 | A1* | 7/2005 | Otsuka | G01C 21/3608 704/226 |
| 2007/0021959 | A1* | 1/2007 | Goto | G10L 21/0272 704/233 |
| 2007/0027685 | A1 | 2/2007 | Arakawa et al. | |
| 2007/0050161 | A1* | 3/2007 | Taenzer | H04R 3/005 702/75 |
| 2009/0067642 | A1* | 3/2009 | Buck | H04R 3/005 381/94.1 |
| 2009/0164212 | A1* | 6/2009 | Chan | G10L 21/0208 704/226 |
| 2009/0196434 | A1 | 8/2009 | Sugiyama et al. | |
| 2009/0234618 | A1 | 9/2009 | Taenzer et al. | |
| 2011/0228951 | A1* | 9/2011 | Sekiya | G10L 21/0208 381/94.1 |
| 2012/0288115 | A1 | 11/2012 | Sugiyama et al. | |
| 2012/0290296 | A1* | 11/2012 | Sugiyama | G10L 21/0208 704/226 |
| 2013/0251079 | A1* | 9/2013 | Miyahara | H04B 1/10 375/346 |
| 2016/0027447 | A1* | 1/2016 | Dickins | H04L 12/1813 704/228 |
| 2016/0275961 | A1* | 9/2016 | Yu | G10K 11/16 |

FOREIGN PATENT DOCUMENTS

| | | |
|---|---|---|
| JP | 2007-033920 | 2/2007 |
| JP | 2009-506363 | 2/2009 |
| JP | 2009-049998 | 3/2009 |
| JP | 4282227 | 6/2009 |
| JP | 2009-282536 | 12/2009 |
| JP | 2011-191669 | 9/2011 |
| JP | 4765461 | 9/2011 |
| JP | 2013-182044 | 9/2013 |
| WO | WO02/054387 | 7/2002 |
| WO | WO2004/107319 | 12/2004 |
| WO | WO2005/024787 | 3/2005 |
| WO | WO2007/025123 | 3/2007 |
| WO | WO2007/025265 | 3/2007 |
| WO | WO2007/029536 | 3/2007 |
| WO | WO2012/070671 | 5/2012 |

OTHER PUBLICATIONS

Handbook of Speech Processing, Chapter 47, "Adaptive Beamforming and Posthltering", Springer , 2008.

* cited by examiner

SIGNAL PROCESSING APPARATUS, SIGNAL PROCESSING METHOD, AND SIGNAL PROCESSING PROGRAM

TECHNICAL FIELD

The present invention relates to a technique of acquiring a desired signal from a mixed signal in which the desired signal and noise coexist.

BACKGROUND ART

In the above technical field, patent literature 1 discloses a technique of reducing residual noise when removing noise components included in input signals, by calculating the phase difference between at least two of input signals of multiple channels and enhancing the phase difference.

CITATION LIST

Patent Literature

Patent literature 1: International Publication No. 2007/025265

Patent literature 2: International Publication No. 2005/024787

Patent literature 3: Japanese Patent No. 4765461

Patent literature 4: Japanese Patent No. 4282227

Non-patent literature 1: Handbook of Speech Processing, Chapter 47, Adaptive Beamforming and Postfiltering, Springer, 2008

SUMMARY OF THE INVENTION

Technical Problem

In the technique described in the above literature, however, although the phase difference is enhanced to reduce residual noise, desired signal components may be unwantedly removed together with noise components.

The present invention enables to provide a technique of solving the above-described problem.

Solution To Problem

One aspect of the present invention provides a signal processing apparatus comprising:

a noise decorrelator that removes noise signals having correlation between at least two input signals, in each of which a desired signal and a noise signal coexist, by receiving the at least two input signals from at least two channels; and a residual noise remover that removes residual noise included in an output signal of the noise decorrelator based on a phase difference between the output signal of the noise decorrelator and at least one input signal included in the at least two input signals.

Another aspect of the present invention provides a signal processing method comprising:

removing noise signals having correlation between at least two input signals, in each of which a desired signal and a noise signal coexist, by receiving the at least two input signals from at least two channels; and removing residual noise included in an output signal in the removing the noise signals, based on a phase difference between the output signal in the removing the noise signals and at least one input signal included in the at least two input signals.

Still other aspect of the present invention provides a signal processing program for causing a computer to execute a method, comprising:

removing noise signals having correlation between at least two input signals, in each of which a desired signal and a noise signal coexist, by receiving the at least two input signals from at least two channels; and removing residual noise included in an output signal in the removing the noise signals, based on a phase difference between the output signal in the removing the noise signals and at least one input signal included in the at least two input signals.

Advantageous Effects of Invention

According to the present invention, it is possible to remove only noise components without removing desired signal components.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise. Note that "speech signal" in the following explanation indicates a direct electrical change that occurs in accordance with speech or another audio and transmits the speech or the other audio, and is not limited to speech.

[First Embodiment]

Figure 1:
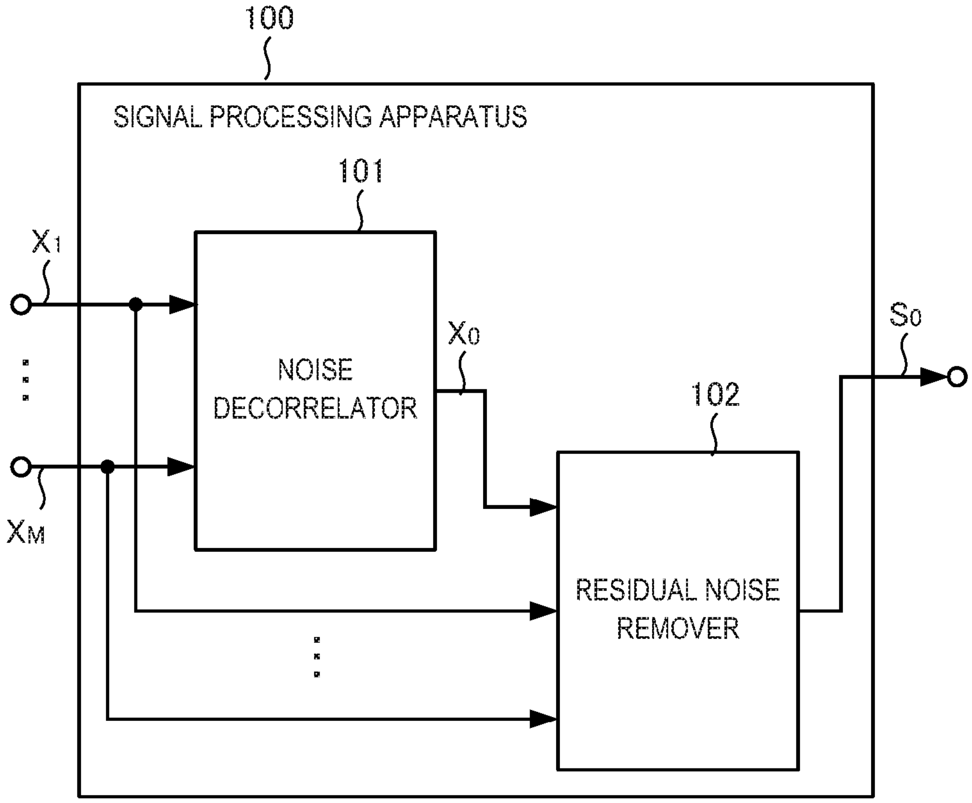
FIG. 1 is a block diagram showing the arrangement of a signal processing apparatus according to the first embodiment of the present invention.
Figure 2:
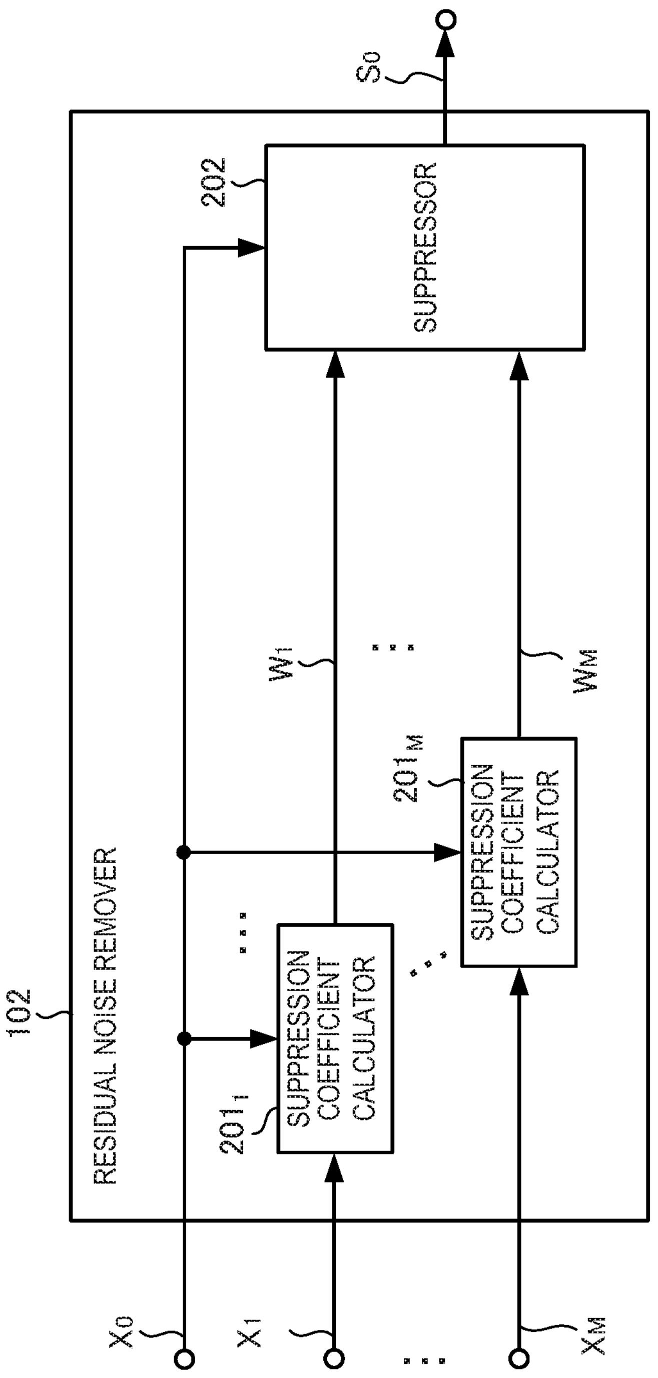
FIG. 2 is a block diagram showing the arrangement of a residual noise remover according to the first embodiment of the present invention.

A signal processing apparatus 100 according to the first embodiment of the present invention will be described with reference to FIGS. 1 and 2. As shown in FIG. 1, the signal processing apparatus 100 includes a noise decorrelator 101 and a residual noise remover 102. As shown in FIG. 2, the residual noise remover 102 includes suppression coefficient calculators 201$_1$ to 201$_M$ and a suppressor 202.

The noise decorrelator 101 receives, from at least two channels, at least two input signals $X_1$ to $X_M$ in each of which a desired signal and a noise signal coexist. The noise decorrelator 101 removes noise components commonly included in the input signals, that is, noise components having correlation between the channels, thereby outputting $X_0$.

The residual noise remover 102 receives the output signal $X_0$ of the noise decorrelator 101 and at least one of the at least two input signals $X_1$ to $X_M$. The residual noise remover 102 removes a noise component included in $X_0$ based on the difference (phase difference) between the phase of the output signal $X_0$ and the phase of at least one of the input signals $X_1$ to $X_M$, thereby outputting $S_0$.

The suppression coefficient calculators 201$_1$ to 201$_M$ calculate suppression coefficients $W_1$ to $W_M$ based on the phase differences between the input signal $X_0$ and the input signals $X_1$ to $X_M$, respectively. The suppressor 202 removes a residual noise component included in the input signal $X_0$ using at least one of the suppression coefficients $W_1$ to $W_M$.

With the above arrangement, it is possible to remove only noise components without removing desired signal components.

[Second Embodiment]

A signal processing apparatus 300 according to the second embodiment of the present invention will be described next with reference to FIGS. 3 to 6. Note that FIG. 6 is a flowchart illustrating processing by the signal processing apparatus according to this embodiment.

(Overall Arrangement)

Figure 3:
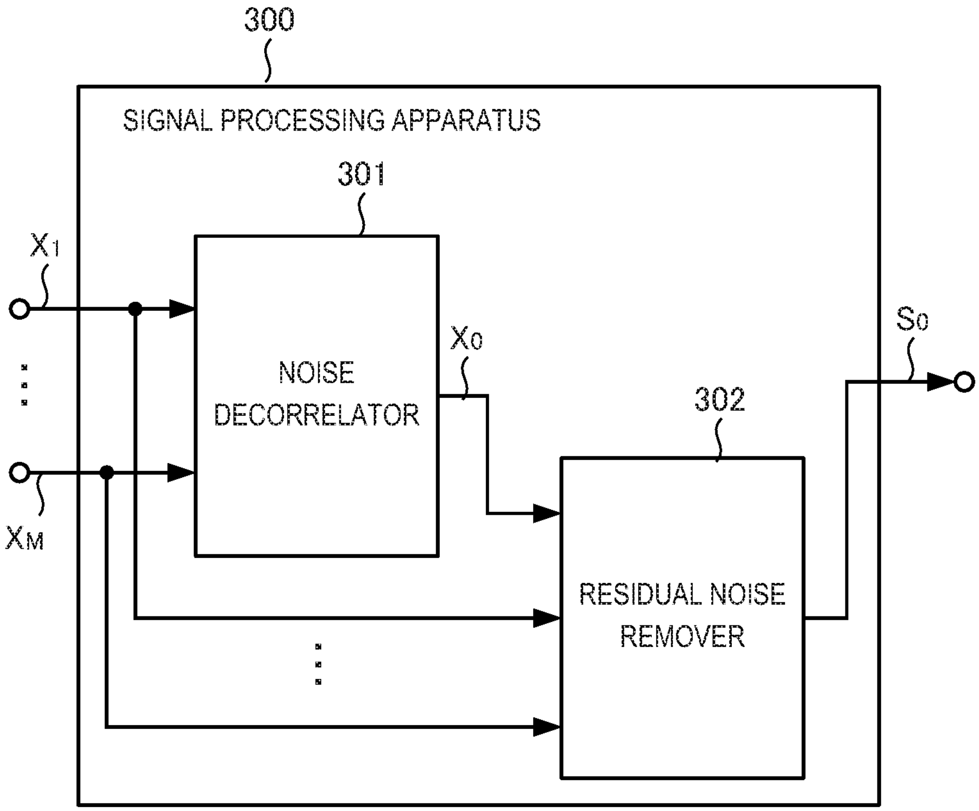
FIG. 3 is a block diagram showing the arrangement of a signal processing apparatus according to the second embodiment of the present invention.

FIG. 3 is a block diagram showing the arrangement of the signal processing apparatus 300 according to this embodiment. In this embodiment, the signal processing apparatus 300 is a system for acquiring a desired signal from mixed signals of multiple channels, in each of which a desired signal and noise coexist. The desired signal will be described as a speech signal below. However, the technical scope of the present invention is not limited to this.

The signal processing apparatus 300 includes a noise decorrelator 301 and a residual noise remover 302. The noise decorrelator 301 receives two or more multi-channel input signals $X_1$ to $X_M$, and mainly removes noise components included in two or more channels, that is, noise components having correlation between the channels, thereby outputting $X_0$.

The residual noise remover 302 receives the output signal $X_0$ of the noise decorrelator 301 and at least one of the multi-channel input signals $X_1$ to $X_M$. The residual noise remover 302 removes a noise component included in $X_0$ based on the difference (phase difference) between the phase of $X_0$ and the phase of at least one of $X_1$ to $X_M$, thereby outputting $S_0$.

(Noise Decorrelator)

The multi-channel input signals $X_1$ to $X_M$ are modeled, as given by:

$$X_1(f,t)=S(f,t)+N_{C1}(f,t)+N_{i1}(f,t) \tag{1-1}$$

$$x_M(f,t)=S(f,t)+N_{CM}(f,t)+N_{iM}(f,t) \tag{1-M}$$

wherein $X_1$ to $X_M$ represent the complex spectra of the input signals, each of which is obtained by performing frequency analysis such as discrete Fourier transform for a signal in the time domain of a corresponding channel, f represents the index of a frequency, and t represents the index of time. In the following explanation, f and t will be omitted except when necessary. Furthermore, S represents the complex spectrum of a desired speech component, $N_{c1}$ to $N_{cM}$ respectively represent noise components included in two or more channels of channels 1 to M, that is, the complex spectra of noise components having correlation between the channels, $N_{i1}$ to $N_{iM}$ respectively represent noise components independently included in respective channels 1 to M, that is, the complex spectra of noise components having low correlation between the channels.

The noise decorrelator 301 mainly removes the noise components $N_{c1}$ to $N_{cM}$ having correlation between the channels using a technique such as an adaptive noise canceller (for example, a method described in patent literature 2: International Publication No. 2005/024787) or an adaptive beamformer (a method described in non-patent literature 1: Handbook of Speech Processing, Chapter 47, Adaptive Beamforming and Postfiltering, Springer, 2008, such as a generalized side-lobe canceller or minimum variance beamformer). Removal processing in the noise decorrelator 301 may be either processing in a frequency domain or processing in a time domain, as a matter of course. If processing of removing noise components having correlation between the channels is performed in the time domain, conversion into the signal $X_0$ in the frequency domain is performed by frequency analysis after the processing. The noise decorrelator 301 outputs $X_0$ given by:

$$X_0=S+N_{i0} \tag{2}$$

where $N_{,i0}$ represents residual noise after the processing of the noise decorrelator 301, and mainly indicates noise components having no correlation between the channels. Note that if the difference (phase difference or amplitude difference) among $N_{c1}$ to $N_{cM}$ of the channels is known in advance, a method which does not require an adaptive operation such as a fixed beamformer which directs null toward a specific space can be used.

(Residual Noise Remover)

Figure 4:
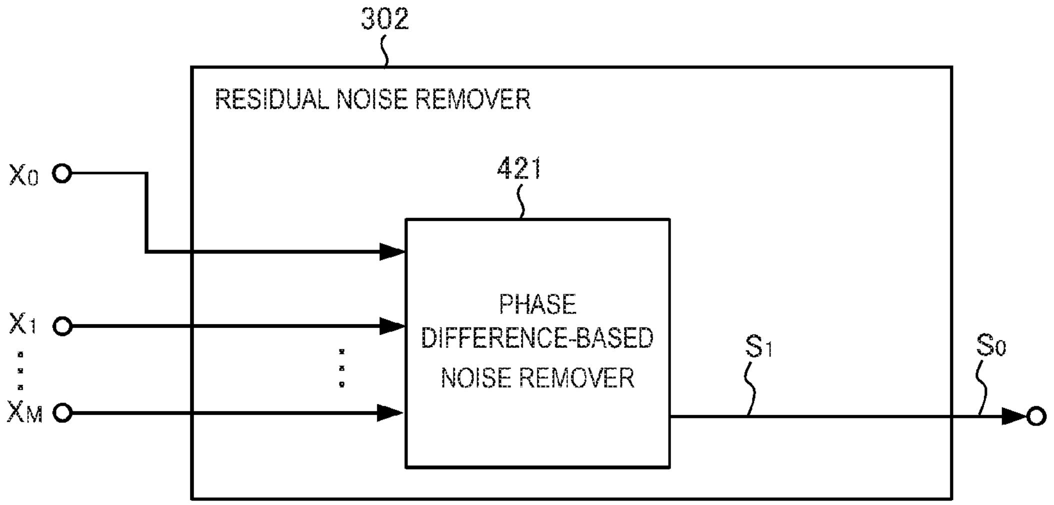
FIG. 4 is a block diagram showing the arrangement of a residual noise remover according to the second embodiment of the present invention.

FIG. 4 shows the arrangement of the residual noise remover 302. The residual noise remover 302 includes a phase difference-based noise remover 421. The phase difference-based noise remover 421 receives the output signal $X_0$ of the noise decorrelator 301 and at least one of the multi-channel input signals $X_1$ to $X_M$. The noise remover 421 removes a noise component included in $X_0$ based on the difference (phase difference) between the phase of $X_0$ and that of at least one of the signals $X_1$ to $X_M$, thereby outputting $S_1$. The residual noise remover 302 outputs $S_1$ as $S_0$.

(Phase Difference-Based Noise Remover)

Figure 5:
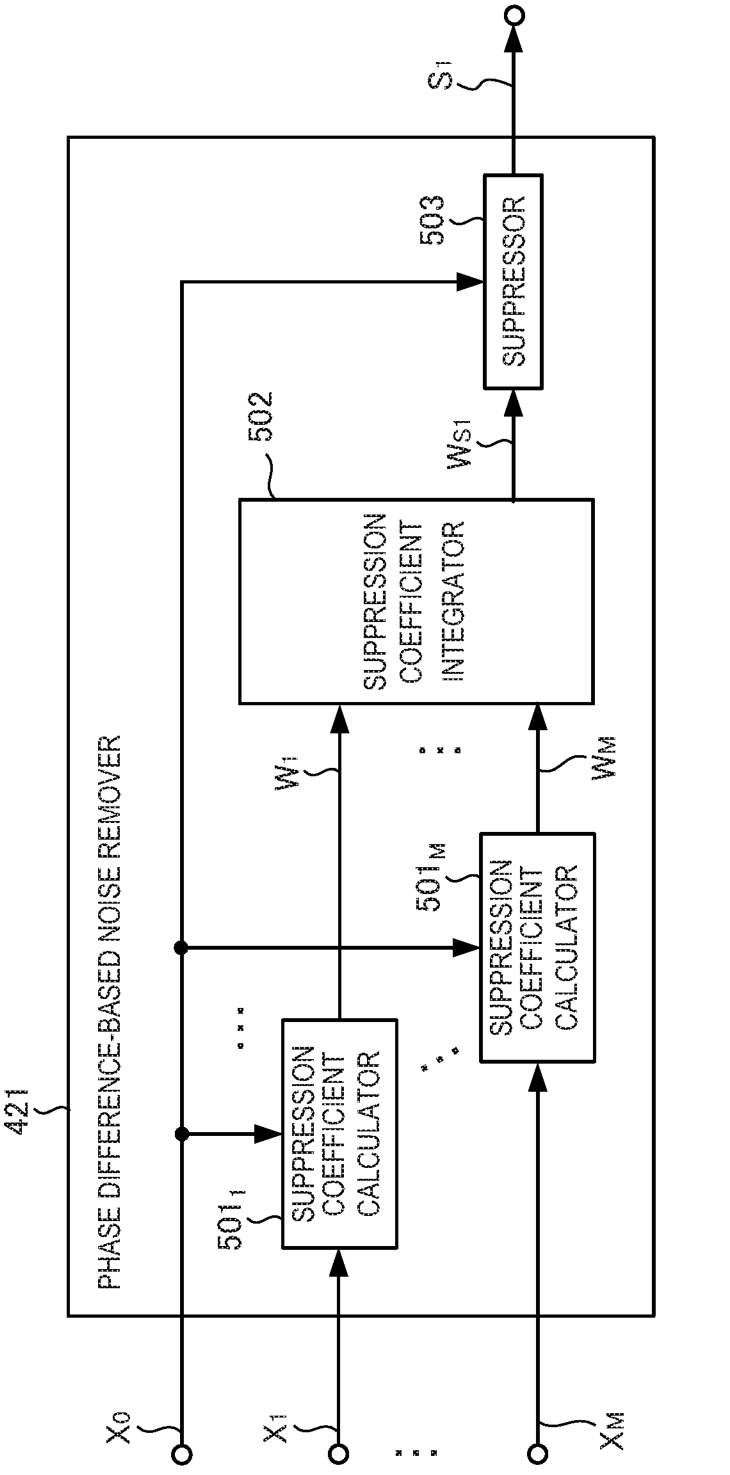
FIG. 5 is a block diagram showing the arrangement of a phase difference-based noise remover according to the second embodiment of the present invention.
Figure 6:
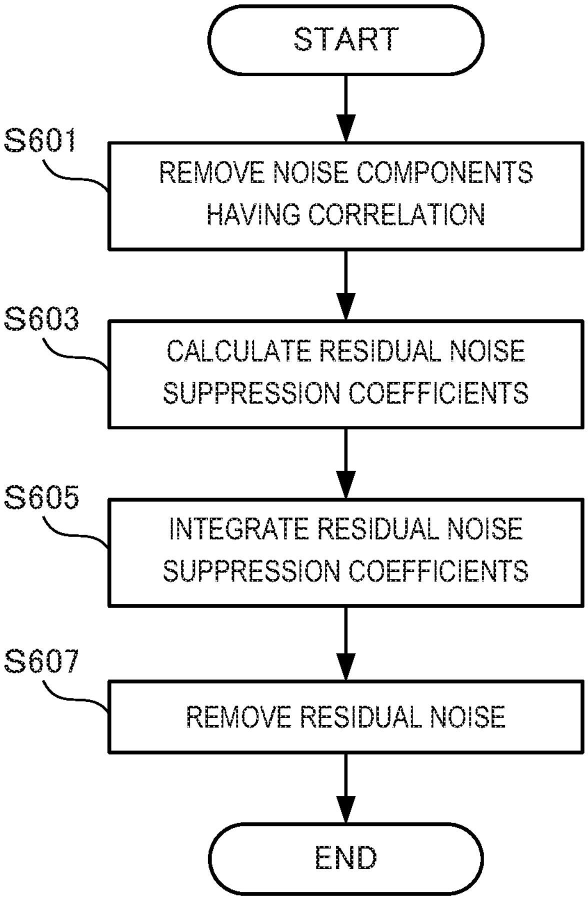
FIG. 6 is a flowchart illustrating a processing sequence by the signal processing apparatus according to the second embodiment of the present invention.

FIG. 5 shows the arrangement of the phase difference-based noise remover 421. The phase difference-based noise remover 421 includes suppression coefficient calculators 501$_1$ to 501$_M$, a suppression coefficient integrator 502, and a suppressor 503.

(Suppression Coefficient Calculator)

The suppression coefficient calculators $\mathbf{501}_1$ to $\mathbf{501}_M$ calculate suppression coefficients $W_1$ to $W_M$ using the output signal $X_0$ of the noise decorrelator 301 and the multi-channel input signals $X_1$ to $X_M$, respectively. Operations for channels 1 to M are the same, and thus the suppression coefficient calculator $\mathbf{501}_1$ will be described.

A phase component $\exp\{-j\theta_{X0}\}$ of $X_0$ input to the suppression coefficient calculator $\mathbf{501}_1$ is obtained by normalizing equation (2) using an amplitude component $|X_0|$ of $X_0$, given by:

$$\frac{X_0}{|X_0|} = \frac{|X_0|e^{-j\theta_{X0}}}{|X_0|} = e^{-j\theta_{X0}} = \frac{S}{|X_0|} + \frac{N_{i0}}{|X_0|} \tag{3}$$

where $\theta_{X0}$ represents the phase of $X_0$.

Similarly, a phase component $\exp\{-j\theta_{X1}\}$ of the input signal $X_1$ of channel 1 is obtained by normalizing equation (1-1) using an amplitude component $|X_1|$ of $X_1$, given by:

$$\frac{X_1}{|X_1|} = \frac{|X_1|e^{-j\theta_{X1}}}{|X_1|} = e^{-j\theta_{X1}} = \frac{S}{|X_1|} + \frac{N_{C1}}{|X_1|} + \frac{N_{i1}}{|X_1|} \tag{4}$$

where $\theta_{X1}$ represents the phase of $X_1$.

Using the phase component $\exp\{-j\theta_{X0}\}$ of $X_0$ and the phase component $\exp\{-j\theta_{X1}\}$ of $X_1$, the suppression coefficient $W_1$ is calculated by:

$$W_1 = \mathrm{Real}[e^{-j\theta_{X0}}(e^{-j\theta_{X1}})^*]\frac{X_1}{|X_0|} \tag{5}$$

where Real[] represents an operator for extracting only the real part of a complex number, and * represents a complex conjugate. If $|X_0|$ is nearly equal to $|X_1|$, a correction term $|X_1|/|X_0|$ of equation (5) can be eliminated. Substituting equations (3) and (4) into equation (5) yields:

$$W_1 = \mathrm{Real}\left[\left(\frac{S}{|X_0|} + \frac{N_{i0}}{|X_0|}\right)\left(\frac{S}{|X_1|} + \frac{N_{C1}}{|X_1|} + \frac{N_{i1}}{|X_1|}\right)^*\right]\frac{|X_1|}{|X_0|} \tag{6}$$

The complex spectra S, $N_{i0}$, $N_{C1}$, and $N_{i1}$ are classified into amplitude components and phase components to take a complex conjugate, as given by:

$$W_1 = \mathrm{Real}\left[\left(\frac{|S|}{|X_0|}e^{-j\theta_S} + \frac{|N_{i0}|}{|X_0|}e^{-j\theta_{Ni0}}\right)\left(\frac{|S|}{|X_1|}e^{j\theta_S} + \frac{|N_{C1}|}{|X_1|}e^{j\theta_{NC1}} + \frac{|N_{i1}|}{|X_1|}e^{j\theta_{Ni1}}\right)\right]\frac{|X_1|}{|X_0|} \tag{7}$$

Further arrangement yields:

$$W_1 = \mathrm{Real}\left[\frac{|S|^2}{|X_0||X_1|} + E_{S1} + E_{N1}\right]\frac{|X_1|}{|X_0|} \tag{8}$$

where $$E_{S1} = \frac{|S||N_{C1}|e^{-j(\theta_S-\theta_{NC1})} + |S||N_{i1}|e^{-j(\theta_S-\theta_{Ni1})} + |N_{i0}||S|e^{-j(\theta_{Ni0}-\theta_S)}}{|X_0||X_1|} \tag{9}$$

$$E_{N1} = \frac{|N_{i0}||N_{C1}|e^{-j(\theta_{Ni0}-\theta_{NC1})} + |N_{i0}||N_{i1}|e^{-j(\theta_{Ni0}-\theta_{Ni1})}}{|X_0||X_1|} \tag{10}$$

If the speech component S and noise components $N_{i0}$, $N_{C1}$, and $N_{i1}$ have no correlation, each phase component randomly takes values between −1 to 1 for the real and imaginary parts in the numerator of each of equations (9) and (10). As a result, the estimated values of $E_{S1}$ and $E_{N1}$ are zero and are negligible. Consequently, equation (8) can be approximately written by:

$$W_1 \approx \mathrm{Real}\left[\frac{|S|^2}{|X_0||X_1|}\right]\frac{|X_1|}{|X_0|} = \frac{|S|^2}{|X_0||X_1|}\frac{|X_1|}{|X_0|} = \frac{|S|^2}{|X_0|^2} \tag{11}$$

Note that based on equation (5), equation (11) is rewritten by:

$$W_1 = \mathrm{Real}[e^{-j(\theta_{X0}-\theta_{X1})}]\frac{|X_1|}{|X_0|} \approx \frac{|S|^2}{|X_0|^2} \tag{12}$$

Therefore, $W_1$ is based on the phase difference ($\theta_{X0}$-$\theta_{X1}$) between $X_0$ and $X_1$.

Similarly, the suppression coefficient calculator $\mathbf{501}_M$ calculates the suppression coefficient $W_M$ by:

$$W_M = \mathrm{Real}[e^{-j\theta_{X0}}(e^{-j\theta_{XM}})^*]\frac{|X_M|}{|X_0|} \approx \frac{|S|^2}{|X_0|^2} \tag{13}$$

The suppression coefficient calculators $\mathbf{501}_1$ to $\mathbf{501}_M$ output $W_1$ and $W_M$ calculated according to equations (5) and (13), respectively. Note that since $|S|$ and $|X_0|$ take positive numbers, and $|S| \le |X_0|$, $W_1$ to $W_M$ may be restricted to fall within the range from 0 to 1, and then output.

(Suppression Coefficient Integrator)

The suppression coefficient integrator 502 receives the suppression coefficients $W_1$ to $W_M$ from the suppression coefficient calculators $\mathbf{501}_1$ to $\mathbf{501}_M$, and outputs an integrated suppression coefficient $W_{S1}$. For example, the integrated suppression coefficient $W_{S1}$ is obtained by:

$$W_{S1} = \mathrm{Ave}[W_1, \ldots , W_M] \approx \frac{|S|^2}{|X_0|^2} \tag{14}$$

where Ave represents an averaging operator. Note that an averaging operation need not be performed using all the suppression coefficients $W_1$ to $W_M$. A suppression coefficient largely different from the average value of all the coefficients may be eliminated, and then an averaging operation may be performed again. Alternatively, an averaging operation may be performed using only the suppression coefficients of channels each of which takes a value falling within a predetermined range, or an averaging operation may be performed using only the suppression coefficients of predetermined channels. Without performing an averaging operation, the suppression coefficient of a predetermined channel may be used or the suppression coefficient of a channel having the maximum value of the suppression coefficients $W_1$ to $W_M$ may be used so as not to remove a desired speech component.

The suppression coefficient integrator 502 receives the suppression coefficients $W_1$ to $W_M$ for each frequency f for every time t. Therefore, instead of the averaging operation for only the channels, as given by equation (14), an averaging operation may be performed for near-by frequencies f and close times t.

(Suppressor)

The suppressor 503 receives the integrated suppression coefficient $W_{S1}$ and the signal $X_0$ from the noise decorrelator 301, and removes residual noise included in $X_0$.

$$S_1 = \sqrt{W_{S1}}\,X_0 \approx \frac{|S|}{|X_0|}|X_0|e^{-jX_0} = |S|e^{-jX_0} \tag{15}$$

As indicated by equation (15), the output signal $S_1$ of the suppressor 503 includes the amplitude component of the desired speech signal as an amplitude component, and the phase component of the signal $X_0$ from the noise decorrelator 301 as a phase component.

FIG. 6 is a flowchart for explaining a noise removal method according to this embodiment. In step S601, input signals input from a plurality of channels are used to remove noise components having correlation, thereby obtaining one output signal. For example, for simplicity, for M=2, Nc1 and Nc2 are eliminated from equations (1-1) and (1-2), thereby solving S. Since Nc1 and Nc2 have correlation, Nc2 can be written using Nc1. Since Ni1 and Ni2 have no relationship, they remain in an output.

In step S603, suppression coefficients for suppressing noise remaining in the output signal obtained in step S601 are calculated using the phase component of the output signal and the phase components of the input signals.

In step S605, an integrated suppression coefficient is obtained using the average of the suppression coefficients.

The process advances to step S607 to remove the residual noise using the integrated suppression coefficient.

According to this embodiment, the noise decorrelator 301 removes noise components having correlation between the channels, thereby obtaining $X_0$. $X_0$ has low correlation with noise components included in the multi-channel input signals $X_1$ to $X_M$ except for a speech component. Therefore, residual noise can be removed by obtaining a noise suppression coefficient based on the difference between the phase of $X_0$ and the phase of at least one of $X_1$ to $X_M$. According to this embodiment, as indicated by equation (15), it is possible to remove only the noise components without removing the desired speech components.

[Third Embodiment]

A signal processing apparatus according to the third embodiment of the present invention will be described with reference to FIGS. 7 and 8. The signal processing apparatus according to this embodiment is the same as that shown in FIG. 3 according to the second embodiment except that the residual noise remover 302 shown in FIG. 3 is replaced by a residual noise remover 702 shown in FIG. 7. Therefore, only the residual noise remover 702 will be described.

Figure 7:
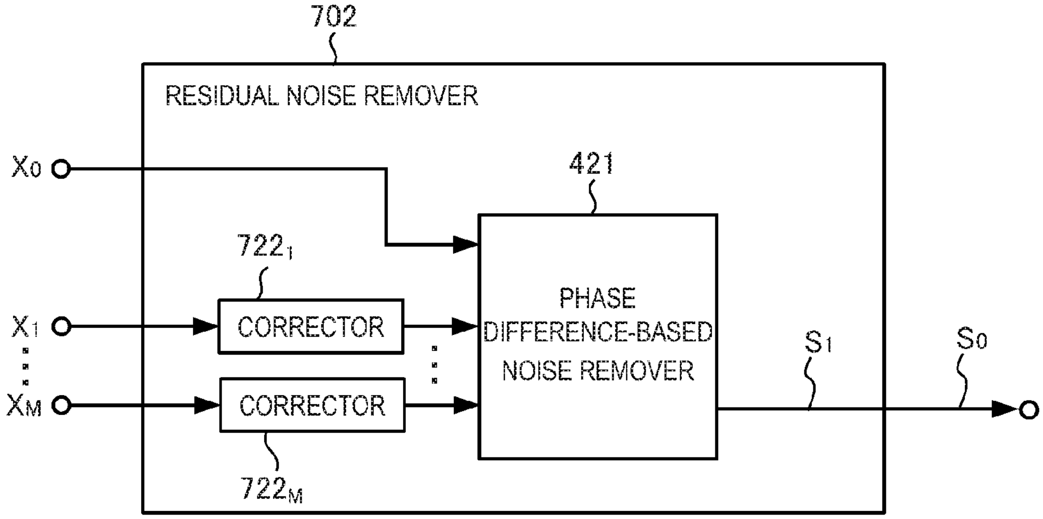
FIG. 7 is a block diagram showing the arrangement of a residual noise remover according to the third embodiment of the present invention.
Figure 8:
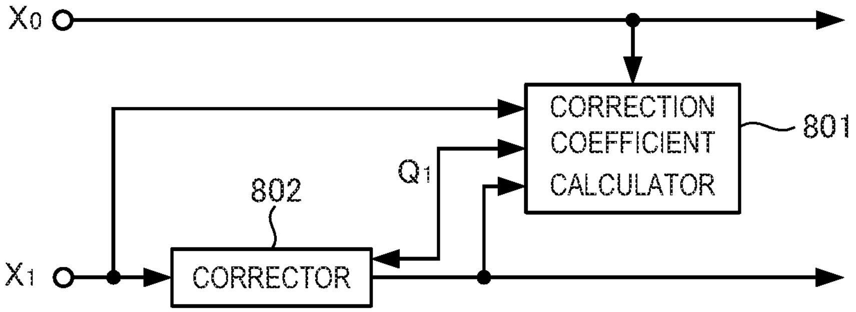
FIG. 8 is a block diagram showing an example of a correction calculator according to the third embodiment of the present invention.

FIG. 7 shows the arrangement of the residual noise remover 702. The residual noise remover 702 includes correctors 722$_1$ to 722$_M$ and a phase difference-based noise remover 421. The phase difference-based noise remover 421 performs the same operation as that of the phase difference-based noise remover shown in FIG. 4, and is denoted by the same reference, and a description thereof will be omitted.

(Corrector)

The correctors 722$_1$ to 722$_M$ respectively receive multi-channel input signals $X_1$ to $X_M$, and correct the input signals, thereby outputting them. Instead of equation (1-1) to (1-M), the input signals $X_1$ to $X_M$ are given by:

$$X_1 = G_1S + N_{C1} + N_{i1} \tag{16-1}$$

$$X_M = G_MS + N_{CM} + N_{iM} \tag{16-M}$$

where $G_1$ to $G_M$ represent frequency responses to speech components included in channels 1 to M, and complex spectra, respectively. Instead of equation (2), an output signal $X_0$ of a noise decorrelator 301 is given by:

$$X_0 = G_0S + N_{i0} \tag{17}$$

where $G_0$ represents a frequency response to a speech component, and a complex spectrum. The correctors 722$_1$ to 722$_M$ perform correction using correction coefficients $Q_1$ to $Q_M$ so that the speech components in equation (16-1) to (16-M) become identical to the speech component indicated by equation (17). The correction coefficients $Q_1$ to $Q_M$ are given by:

$$Q_1 = \frac{G_0}{G_1} \tag{18-1}$$

$$Q_M = \frac{G_0}{G_M} \tag{18-M}$$

That is, the input signals $X_1$ to $X_M$ are multiplied by the correction coefficients $Q_1$ to $Q_M$, respectively, given by:

$$Q_1X_1 = G_0S + Q_1N_{C1} + Q_1N_{i1} \tag{19-1}$$

$$Q_MX_M = G_0S + Q_MN_{CM} + Q_MN_{iM} \tag{19-M}$$

Assume that $$G_0S = \acute{S} \tag{20}$$

$$Q_1X_1 = \acute{X}_1 \tag{21-1}$$

$$Q_MX_M = \acute{X}_M \tag{21-M}$$

$$Q_1N_{C1} = \acute{N}_{C1} \tag{22-1}$$

$$Q_MN_{CM} = \acute{N}_{CM} \tag{22-M}$$

$$Q_1N_{i1} = \acute{N}_{i1} \tag{23-1}$$

$$Q_MN_{iM} = \acute{N}_{iM} \tag{23-M}$$

In this case, equations (19-1) to (19-M) and (17) are written by:

$$\acute{X}_1 = \acute{S} + \acute{N}_{C1} + \acute{N}_{i1} \tag{24-1}$$

$$\acute{X}_M = \acute{S} + \acute{N}_{CM} + \acute{N}_{iM} \tag{24-M}$$

$$X_0 = \acute{S} + N_{i0} \tag{25}$$

By receiving signals $X'_1$ to $X'_M$ of multiple channels indicated by equations (24-1) to (24-M) and the signal $X_0$ indicated by equation (25), the phase difference-based noise remover 421 can remove residual noise included in $X_0$.

The correction coefficients $Q_1$ to $Q_M$ indicated by equations (18-1) to (18-M) can be predetermined depending on, for example, the arrangement of microphones for acquiring the multi-channel input signals $X_1$ to $X_M$, the positions of speakers who speak, and processing contents in the noise decorrelator 301. The correction coefficients $Q_1$ to $Q_M$ can be calculated using $X_0$, the signals $X_1$ to $X_M$ of the multiple channels before correction, and the signals $X'_1$ to $X'_M$ of the multiple channels after correction. Operations for channels 1 to M are the same, and thus FIG. 8 exemplifies only the case of channel 1. FIG. 8 shows a correction coefficient calculator 801 and a corrector 802 for channel 1. The corrector 802 is the same as the corrector 722$_1$ except that it exchanges the correction coefficient $Q_1$ with the correction coefficient calculator 801.

(Correction Coefficient Calculator)

The correction coefficient calculator 801 updates the correction coefficient $Q_1$ so as to minimize the error between $X_0$ and $X'_1$. $X_0$ and $X'_1$ have high correlation with respect to only speech components included in both the signals. The LMS (Least Mean Square) method, normalization LMS method, or the like used to update an adaptive filter is used for the update processing.

$$Q_1(f,t+1)=Q_1(f,t)+\mu X^*_1(f,t)\{X_0(f,t)-\acute{X}_1(f,t)\} \tag{26}$$

where μ represents a step size parameter for adjusting the degree of update.

In this embodiment, even if there are differences between the frequency response $G_0$ to the speech component included in $X_0$ indicated by equation (17) and the frequency responses $G_1$ to $G_M$ to the speech components included in the multichannel input signals $X_1$ to $X_M$ indicated by equations (16-1) to (16-M), the correctors 722$_1$ to 722$_M$ correct the multichannel input signals $X_1$ to $X_M$, respectively. This allows the residual noise remover 702 to remove a residual noise component included in $X_0$. That is, the signal processing apparatus according to this embodiment can remove only noise components without removing desired speech components.

[Fourth Embodiment]

A signal processing apparatus according to the fourth embodiment of the present invention will be described with reference to FIGS. 9 and 10. The signal processing apparatus according to this embodiment is the same as that according to the second embodiment except that the residual noise remover 302 shown in FIG. 3 is replaced by a residual noise remover 902 shown in FIG. 9. Therefore, only the residual noise remover 902 will be described.

Figure 9:
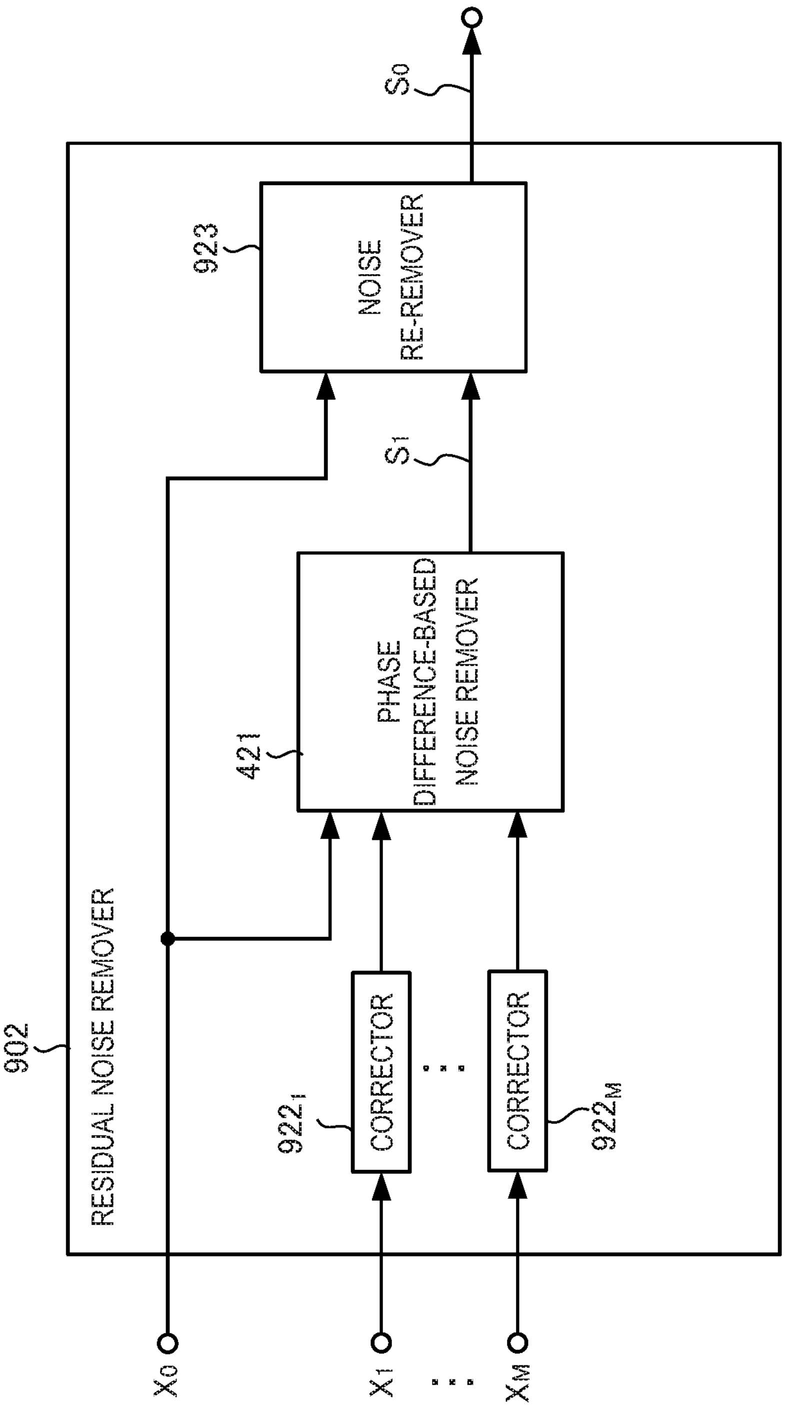
FIG. 9 is a block diagram showing the arrangement of a residual noise remover according to the fourth embodiment of the present invention.
Figure 10:
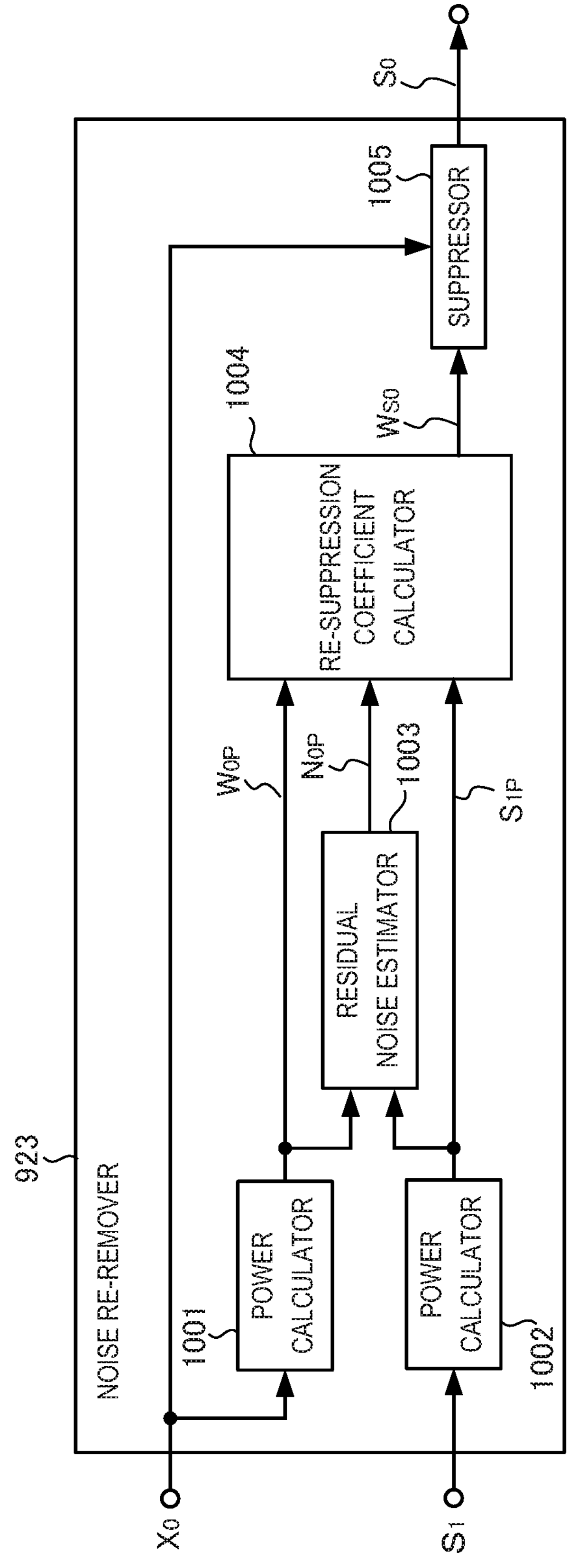
FIG. 10 is a block diagram showing the arrangement of a noise re-remover according to the fourth embodiment of the present invention.

FIG. 9 shows the arrangement of the residual noise remover 902. The residual noise remover 902 includes correctors 922$_1$ to 922$_M$, a phase difference-based noise remover 421, and a noise re-remover 923. The operations of the correctors 922$_1$ to 922$_M$ are the same as those of the corrector 722$_1$ to 722$_M$ shown in FIG. 7, and the phase difference-based noise remover 421 performs the same operation as that of the phase difference-based noise remover 421 shown in FIG. 4. Thus, a description of the correctors 922$_1$ to 922$_M$ and phase difference-based noise remover 421 will be omitted.

(Noise Re-remover)

The noise re-remover 923 receives an output signal $X_0$ of a noise decorrelator, and an output signal $S_1$ of the phase difference-based noise remover, which is obtained by removing residual noise included in $X_0$, and re-removes the residual noise included in $X_0$. FIG. 10 shows the arrangement of the noise re-remover 923. The noise re-remover 923 includes power calculators 1001 and 1002, a residual noise estimator 1003, a re-suppression coefficient calculator 1004, and a suppressor 1005.

(Power Calculator)

The power calculators 1001 and 1002 calculate the power of $X_0$ and the power of $S_1$, and output them, respectively. That is, the power calculators 1001 and 1002 respectively output $X_{0P}$ and $S_{1P}$ given by:

$$X_{0P}=|X_0|^2=X_1X^*_1 \tag{27}$$

$$S_{1P}=|S_1|^2=S_1S^*_1 \tag{28}$$

(Residual Noise Estimator)

The residual noise estimator 1003 estimates the power of the residual noise using $X_{0P}$ and $S_{1P}$, and outputs it as an estimated noise power. That is, the residual noise estimator 1003 outputs $N_{0P}$ given by:

$$N_{0P}=\max[0,X_{0P}-S_{1P}] \tag{29}$$

where max[] represents an operator for acquiring a maximum value.

(Re-Suppression Coefficient Calculator)

The re-suppression coefficient calculator 1004 calculates a re-suppression coefficient $W_{S0}$ using $X_{0P}$, $S_{1P}$, and $N_{0P}$, and outputs it. For example, $$W_{S0}(f,t)=\frac{\eta_{DD}(f,t)}{1+\eta_{DD}(f,t)} \tag{30}$$

where $\eta_{DD}$ represents a pre-SNR given by:

$$\eta_{DD}(f,t)=\alpha\frac{W_{S0}(f,t-1)X_{0P}(f,t-1)}{N_{0P}(f,t-1)}+(1-\alpha)\frac{S_{1P}(f,t)}{N_{0P}(f,t)} \tag{31}$$

where α represents a constant, and is predetermined, for example, α=0.98. By combination with a past signal, the estimation accuracy of $\eta_{DD}$ is improved.

Furthermore, $\eta_{DD}$ may be calculated by:

$$\eta_{DD}(f,t)=\frac{S_{1PDD}(f,t)}{N_{0PDD}(f,t)} \tag{32}$$

where $$S_{1PDD}(f,t)=\alpha W_{S0}(f,t-1)X_{0P}(f,t-1)+(1-\alpha)S_{1P}(f,t) \tag{33}$$

$$N_{0PDD}(f,t)=\alpha\{1-W_{S0}(f,t-1)\}X_{0P}(f,t-1)+(1-\alpha)N_{0P}(f,t) \tag{34}$$

By separately calculating the denominator and numerator of equation (32) using the past signal, as indicated by equations (33) and (34), the value of $\eta_{DD}$ becomes more stable.

Furthermore, $S_{1P}$ and $S_{1PDD}$ of equations (31) to (34) can be corrected by the pattern (model) of a desired signal (for example, speech) using a method described in patent literature 3: Japanese Patent No. 4765461.

Instead of using equation (30), the re-suppression coefficient $W_{S0}$ may be calculated by:

$$W_{S0}(f,t)=\frac{\eta_{DD}(f,t)\gamma(f,t)}{1+\eta_{DD}(f,t)+\eta_{DD}(f,t)\gamma(f,t)} \tag{35}$$

here $\gamma$ represents a post-SNR given by:

$$\gamma(f,t)=\frac{X_{0P}(f,t)}{N_{0P}(f,t)} \tag{36}$$

By using the current signal $X_{0P}$ for calculation of the re-suppression coefficient, the suppression accuracy is improved at the rising of a speech signal. $N_{0PDD}$ of equation (34) may be used as $N_{0P}$ of the denominator on the right-hand side of equation (36), as a matter of course. A method such as the MMSE STSA (Minimum Mean Square Error Short Time Spectral Amplitude) method or MMSE LSA (Minimum Mean Square Error Log Spectral Amplitude) method, which is different from equations (30) and (35), may be used, as a matter of course.

(Suppressor)

The suppressor 1005 receives the signal $X_0$ from a noise decorrelator 301 and the re-suppression coefficient $W_{S0}$, and removes residual noise included in $X_0$.

$$S_0=\sqrt{W_{S0}}X_0 \tag{37}$$

The suppressor 1005 outputs a signal $S_0$.

In this embodiment, as indicated by equations (31), (33), and (34), a re-suppression coefficient is calculated by combination with a past signal, or calculated by performing correction by the pattern (model) of a desired signal. As indicated by equation (36), the current signal $X_{0P}$ is used for calculation of a re-suppression coefficient. This makes it possible to more accurately remove only noise components without removing desired speech components.

[Fifth Embodiment]

A signal processing apparatus according to the fifth embodiment of the present invention will be described with reference to FIGS. 11 and 12. The signal processing apparatus according to this embodiment is the same as that according to the second embodiment except that the residual noise remover 302 shown in FIG. 3 is replaced by a residual noise remover 1102 shown in FIG. 11. Therefore, only the residual noise remover 1102 will be described.

Figure 11:
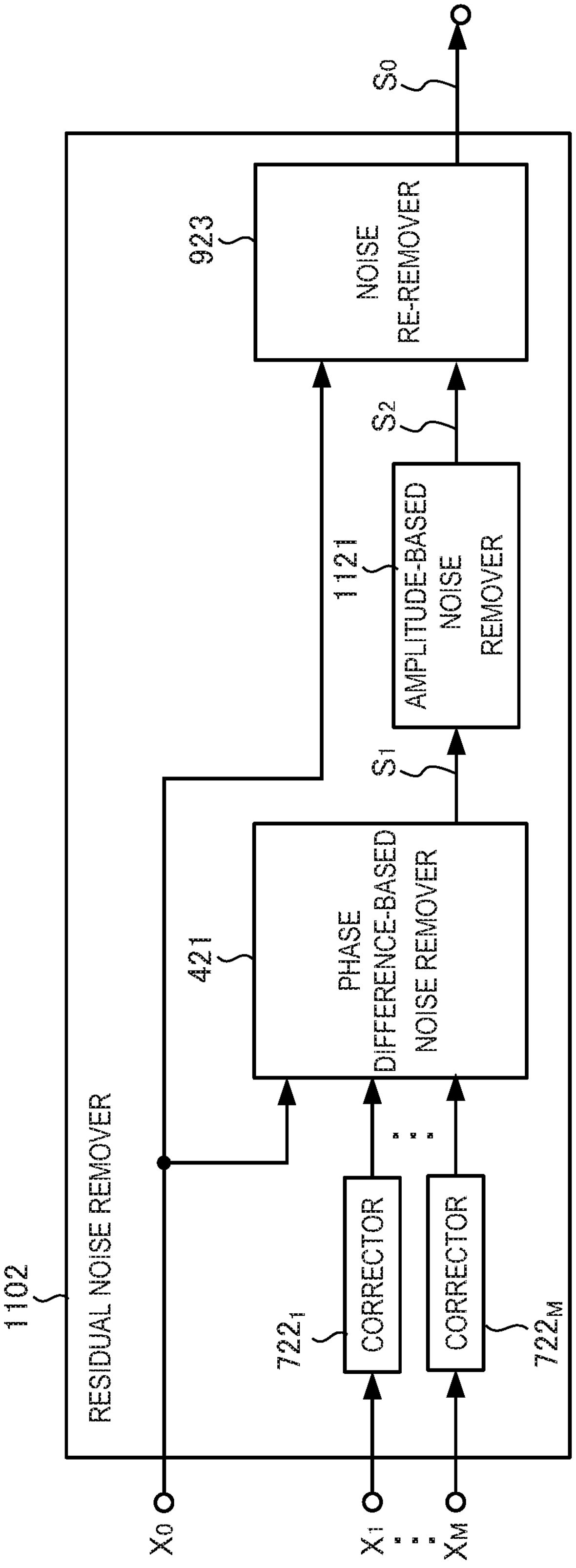
FIG. 11 is a block diagram showing the arrangement of a residual noise remover according to the fifth embodiment of the present invention.
Figure 12:
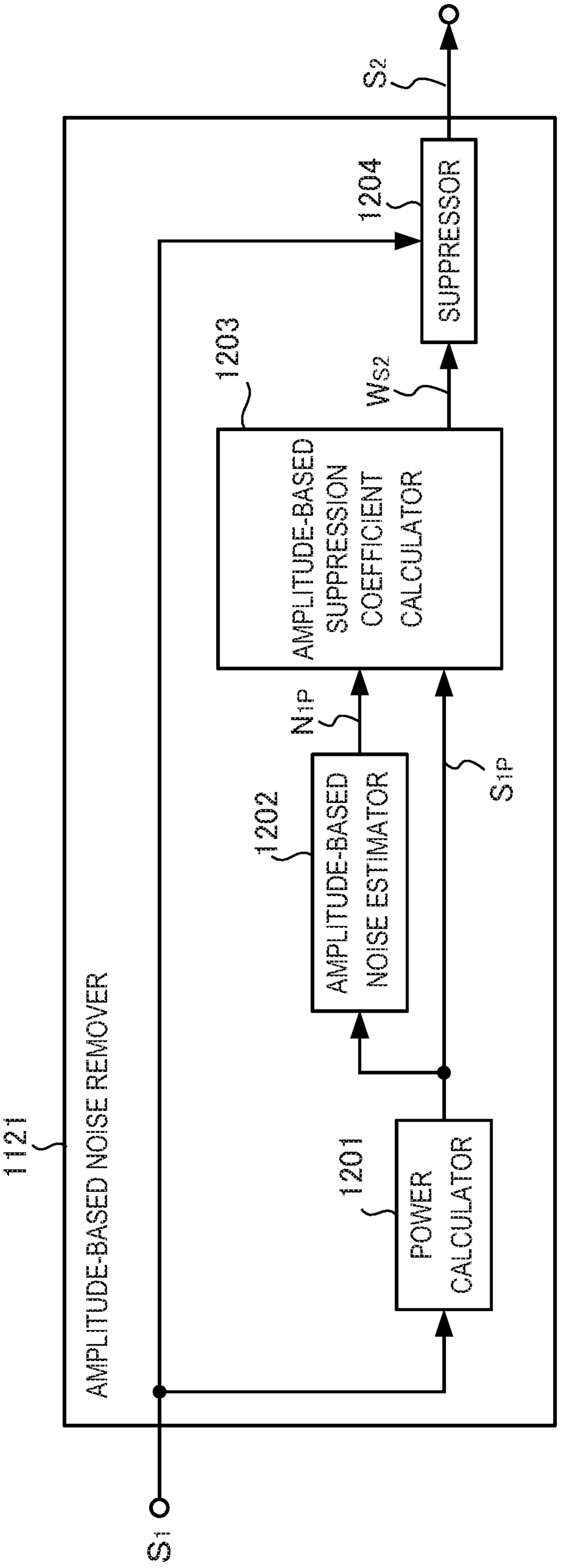
FIG. 12 is a block diagram showing the arrangement of an amplitude-based noise remover according to the fifth embodiment of the present invention.

FIG. 11 shows the arrangement of the residual noise remover 1102. The residual noise remover 1102 includes correctors $\mathbf{722}_1$ to $\mathbf{722}_M$, a phase difference-based noise remover 421, a noise re-remover 923, and an amplitude-based noise remover 1121. The correctors $\mathbf{722}_1$ to $\mathbf{722}_M$ perform the same operations as those of the correctors described with reference to FIG. 7, and are denoted by the same reference numerals, and a description thereof will be omitted. The phase difference-based noise remover 421 performs the same operation as that of the phase difference-based noise remover shown in FIG. 4, and is denoted by the same reference numeral, and a description thereof will be omitted. The noise re-remover 923 performs the same operation as that of the noise re-remover shown in FIG. 9, and is denoted by the same reference, and a description thereof will be omitted.

(Amplitude-Based Noise Remover)

The amplitude-based noise remover 1121 receives at least an output signal $S_1$ of the phase difference-based noise remover 421, removes residual noise included in $S_1$, and outputs $S_2$. FIG. 12 shows the arrangement of the amplitude-based noise remover 1121. The amplitude-based noise remover 1121 includes a power calculator 1201, an amplitude-based noise estimator 1202, an amplitude-based suppression coefficient calculator 1203, and a suppressor 1204.

(Power Calculator)

The power calculator 1201 calculates the power of $S_1$, and outputs it. That is, the power calculator 1201 outputs $S_{1P}$ given by:

$$S_{1P}=|S_1|^2=S_1S^*_1 \tag{38}$$

(Amplitude-Based Noise Estimator)

The amplitude-based noise estimator 1202 estimates the power of residual noise included in $S_{1P}$ using at least $S_{1P}$, and outputs it. That is, the amplitude-based noise estimator 1202 outputs $N_{1P}$ given by:

$$N_{1P}=NE[S_{1P}] \tag{39}$$

Note that NE[] represents a noise power estimation operator which can use various noise power estimation methods such as the minimum statistics method and a weighted noise estimation method described in patent literature 4: Japanese Patent No. 4282227.

(Amplitude-Based Suppression Coefficient Calculator)

The amplitude-based suppression coefficient calculator 1203 calculates an amplitude-based suppression coefficient $W_{S2}$ using $S_{1P}$ and $N_{1P}$, and outputs it. For example, $$W_{S2}(f,t)=\frac{\eta_{DD}(f,t)}{1+\eta_{DD}(f,t)} \tag{40}$$

where $\eta_{DD}$ represents a pre-SNR given by:

$$\eta_{DD}(f,t)=\alpha\frac{W_{S2}(f,t-1)S_{1P}(f,t-1)}{N_{1P}(f,t-1)}+(1-\alpha)\max\left[0,\frac{S_{1P}(f,t)}{N_{1P}(f,t)}-1\right] \tag{41}$$

where $\alpha$ is a constant, and is predetermined, for example, $\alpha$=0.98.

Furthermore, $\eta_{DD}$ may be calculated by:

$$\eta_{DD}(f,t)=\frac{S_{1PDD}(f,t)}{N_{1PDD}(f,t)} \tag{42}$$

where $$S_{1PDD}(f,t)=\alpha W_{S2}(f,t-1)S_{1P}(f,t-1)+(1-\alpha)\max[0,S_{1P}(f,t)-N_{1P}(f,t)] \tag{43}$$

$$N_{1PDD}(f,t)=\alpha\{1-W_{S2}(f,t-1)\}S_{1P}(f,t-1)+(1\alpha)N_{1P}(f,t) \tag{44}$$

By separately calculating the denominator and numerator of equation (42) using a past signal, as indicated by equations (43) and (44), the value of $\eta_{DD}$ becomes more stable.

Instead of using equation (40), the amplitude-based suppression coefficient $W_{S2}$ may be calculated by:

$$W_{S2}(f,t)=\frac{\eta_{DD}(f,t)\gamma(f,t)}{1+\eta_{DD}(f,t)+\eta_{DD}(f,t)\gamma(f,t)} \tag{45}$$

where $\gamma$ represents a post-SNR given by:

$$\gamma(f,t)=\frac{S_{1P}(f,t)}{N_{1P}(f,t)} \tag{46}$$

By using the current signal $S_{1P}$ for calculation of the amplitude-based suppression coefficient, the suppression accuracy is improved at the rising of a speech signal. $N_{1PDD}$ of equation (44) may be used as $N_{1P}$ of the denominator on the right-hand side of equation (46), as a matter of course.

(Suppressor)

The suppressor 1204 receives the signal $S_1$ from the phase difference-based noise remover 421 and the amplitude-based suppression coefficient $W_{S2}$, and removes residual noise included in $S_1$.

$$S_2=\sqrt{W_{S2}}S_1 \quad (47)$$

The suppressor 1204 outputs a signal $S_2$.

In this embodiment, the amplitude-based noise remover 1121 is used at not the succeeding stage but the preceding stage of the noise re-remover 923. This allows the phase difference-based noise remover 421 to more accurately remove only noise components without removing desired speech components even if $E_{S1}$ and $E_{N1}$ indicated by equations (9) and (10) are not zero.

[Other Embodiments]

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, a microphone unit including the signal processing apparatus according to the above embodiments is incorporated in the present invention.

The present invention is applicable to a system including a plurality of devices or a single apparatus. The present invention is also applicable even when a multi-channel noise removal program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described embodiments.

[Other Expressions of Embodiments]

Some or all of the above-described embodiments can also be described as in the following supplementary notes but are not limited to the followings.

(Supplementary Note 1)

There is provided a signal processing apparatus comprising:

a noise decorrelator that removes noise signals having correlation between at least two input signals, in each of which a desired signal and a noise signal coexist, by receiving the at least two input signals from at least two channels; and a residual noise remover that removes residual noise included in an output signal of the noise decorrelator based on a phase difference between the output signal of the noise decorrelator and at least one input signal included in the at least two input signals.

(Supplementary Note 2)

There is provided the signal processing apparatus according to supplementary note 1, wherein the residual noise remover includes a phase difference-based noise remover.

(Supplementary Note 3)

There is provided the signal processing apparatus according to supplementary note 2, wherein the phase difference-based noise remover includes a suppression coefficient calculator that calculates a suppression coefficient based on the phase difference between the output signal of the noise decorrelator and the at least one input signal, a suppression coefficient integrator that receives the suppression coefficient from the at least one suppression coefficient calculator, and outputs an integrated suppression coefficient, and a suppressor that suppresses the residual noise included in the output signal of the noise decorrelator using the integrated suppression coefficient from the suppression coefficient integrator.

(Supplementary Note 4)

There is provided the signal processing apparatus according to supplementary note 2 or 3, wherein the residual noise remover includes a corrector that corrects the input signal of each channel at a preceding stage of the phase difference-based noise remover.

(Supplementary Note 5)

There is provided the signal processing apparatus according to any one of supplementary notes 2 to 4, wherein the residual noise remover includes a noise re-remover at a succeeding stage of the phase difference-based noise remover.

(Supplementary Note 6)

There is provided the signal processing apparatus according to supplementary note 5, wherein the noise re-remover includes a residual noise estimator that estimates a power of the residual noise from a power of the output signal of the noise decorrelator and a power of an output signal of the phase difference-based noise remover, a re-suppression coefficient calculator that calculates a re-suppression coefficient using the power of the output signal of the noise decorrelator, the power of the output signal of the phase difference-based noise remover, and the estimated power of the residual noise, and a suppressor that suppresses the residual noise included in the output signal of the noise decorrelator using the re-suppression coefficient from the re-suppression coefficient calculator.

(Supplementary Note 7)

There is provided the signal processing apparatus according to supplementary note 5, wherein the residual noise remover includes an amplitude-based noise remover at the succeeding stage of the phase difference-based noise remover and at a preceding stage of the noise re-remover.

(Supplementary Note 8)

There is provided the signal processing apparatus according to supplementary note 7, wherein the amplitude-based noise remover includes an amplitude-based noise estimator that estimates a power of noise included in an output signal of the phase difference-based noise remover, an amplitude-based suppression coefficient calculator that calculates an amplitude-based suppression coefficient using a power of the output signal of the phase difference-based noise remover and the estimated noise power from the amplitude-based noise estimator, and a suppressor that suppresses noise included in the output signal of the phase difference-based noise remover using the amplitude-based suppression coefficient from the amplitude-based suppression coefficient calculator.

(Supplementary Note 9)

There is a signal processing method comprising:

removing noise signals having correlation between at least two input signals, in each of which a desired signal and a noise signal coexist, by receiving the at least two input signals from at least two channels; and removing residual noise included in an output signal in the removing the noise signals, based on a phase difference between the output signal in the removing the noise signals and at least one input signal included in the at least two input signals.

(Supplementary Note 10)

There is provided a signal processing program for causing a computer to execute a method, comprising:

removing noise signals having correlation between at least two input signals, in each of which a desired signal and a noise signal coexist, by receiving the at least two input signals from at least two channels; and removing residual noise included in an output signal in the removing the noise signals, based on a phase difference between the output signal in the removing the noise signals and at least one input signal included in the at least two input signals.

This application claims the benefit of Japanese Patent Application No. 2014-054239, filed on Mar. 17, 2014, which is hereby incorporated by reference in its entirety.

The invention claimed is:

1. A signal processing apparatus comprising:

a processor that includes:

a noise decorrelator that removes noise signals having correlation between at least two input signals, in each of which a desired signal and a noise signal coexist, by receiving the at least two input signals from at least two channels; and a residual noise remover that removes residual noise included in an output signal of said noise decorrelator based on a phase difference between the output signal of said noise decorrelator and at least one input signal included in the at least two input signals, wherein said residual noise remover includes a phase difference-based noise remover having:

a suppression coefficient calculator that calculates a suppression coefficient based on the phase difference between the output signal of said noise decorrelator and the at least one input signal, a suppression coefficient integrator that receives the suppression coefficient from said at least one suppression coefficient calculator, and outputs an integrated suppression coefficient, and a suppressor that suppresses the residual noise included in the output signal of said noise decorrelator using the integrated suppression coefficient from the suppression coefficient integrator.

2. The signal processing apparatus according to claim 1, wherein said residual noise remover includes a corrector that corrects the input signal of each channel at a preceding stage of said phase difference-based noise remover.

3. The signal processing apparatus according to claim 1, wherein said residual noise remover includes a noise re-remover at a succeeding stage of said phase difference-based noise remover.

4. The signal processing apparatus according to claim 3, wherein said noise re-remover includes a residual noise estimator that estimates a power of the residual noise from a power of the output signal of said noise decorrelator and a power of an output signal of said phase difference-based noise remover, a re-suppression coefficient calculator that calculates a re-suppression coefficient using the power of the output signal of said noise decorrelator, the power of the output signal of said phase difference-based noise remover, and the estimated power of the residual noise, and a suppressor that suppresses the residual noise included in the output signal of said noise decorrelator using the re-suppression coefficient from said re-suppression coefficient calculator.

5. The signal processing apparatus according to claim 3, wherein said residual noise remover includes an amplitude-based noise remover at the succeeding stage of said phase difference-based noise remover and at a preceding stage of said noise re-remover.

6. The signal processing apparatus according to claim 5, wherein said amplitude-based noise remover includes an amplitude-based noise estimator that estimates a power of noise included in an output signal of said phase difference-based noise remover, an amplitude-based suppression coefficient calculator that calculates an amplitude-based suppression coefficient using a power of the output signal of said phase difference-based noise remover and the estimated noise power from said amplitude-based noise estimator, and a suppressor that suppresses noise included in the output signal of said phase difference-based noise remover using the amplitude-based suppression coefficient from the amplitude-based suppression coefficient calculator.

7. A signal processing method comprising:

removing noise signals having correlation between at least two input signals, in each of which a desired signal and a noise signal coexist, by receiving the at least two input signals from at least two channels; and removing residual noise included in an output signal in the removing the noise signals, based on a phase difference between the output signal in the removing the noise signals and at least one input signal included in the at least two input signals, wherein said removing residual noise includes using a phase difference-based noise remover having:

a suppression coefficient calculator that calculates a suppression coefficient based on the phase difference between the output signal and the at least one input signal, a suppression coefficient integrator that receives the suppression coefficient from said at least one suppression coefficient calculator, and outputs an integrated suppression coefficient, and a suppressor that suppresses the residual noise included in the output signal using the integrated suppression coefficient from the suppression coefficient integrator.

8. A non-transitory computer readable medium storing a signal processing program for causing a computer to execute a method, comprising:

removing noise signals having correlation between at least two input signals, in each of which a desired signal and a noise signal coexist, by receiving the at least two input signals from at least two channels; and removing residual noise included in an output signal in the removing the noise signals, based on a phase difference between the output signal in the removing the noise signals and at least one input signal included in the at least two input signals, wherein said removing residual noise includes using a phase difference-based noise remover having:

a suppression coefficient calculator that calculates a suppression coefficient based on the phase difference between the output signal and the at least one input signal, a suppression coefficient integrator that receives the suppression coefficient from said at least one suppression coefficient calculator, and outputs an integrated suppression coefficient, and a suppressor that suppresses the residual noise included in the output signal using the integrated suppression coefficient from the suppression coefficient integrator.

* * * * *